Feb. 27, 1945.   J. LEDWINKA   2,370,605
TRUCK, ESPECIALLY FOR RAIL CARS
Filed Nov. 6, 1941   4 Sheets-Sheet 1
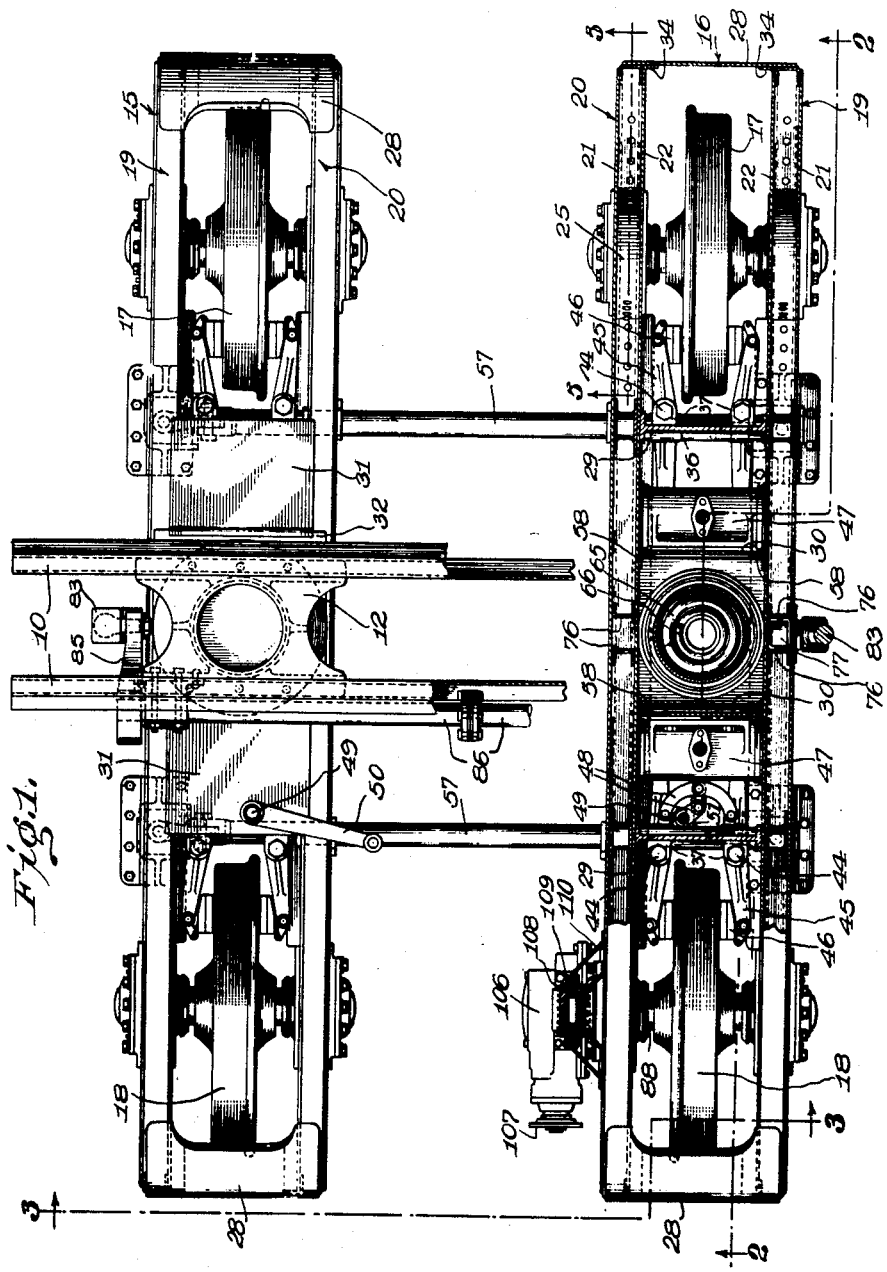
INVENTOR
Joseph Ledwinka
BY John P. Tarbox
ATTORNEY

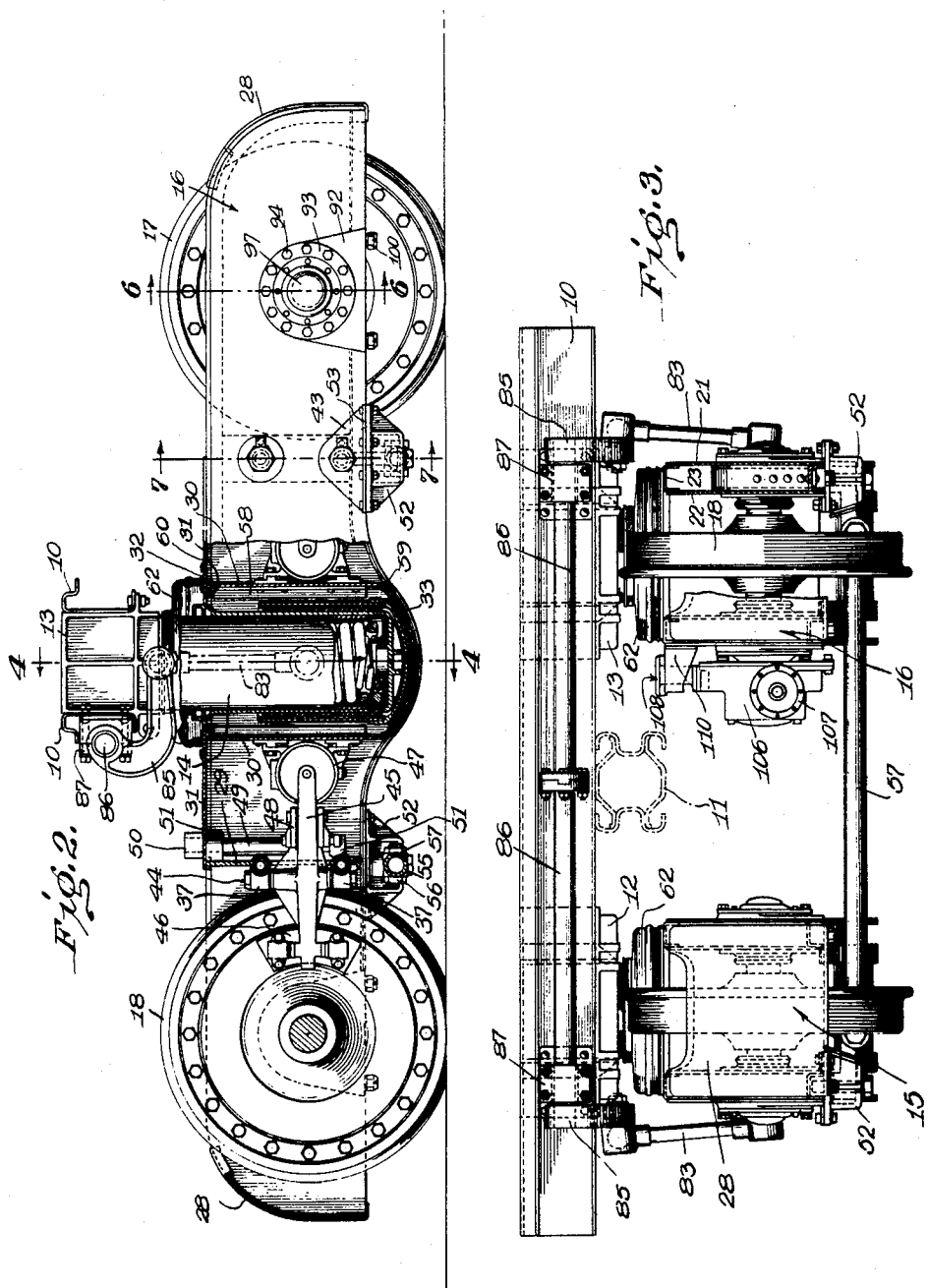

Feb. 27, 1945.   J. LEDWINKA   2,370,605
TRUCK, ESPECIALLY FOR RAIL CARS
Filed Nov. 6, 1941   4 Sheets-Sheet 3

INVENTOR
Joseph Ledwinka
BY John P. Tarbox
ATTORNEY

Feb. 27, 1945.  J. LEDWINKA  2,370,605
TRUCK, ESPECIALLY FOR RAIL CARS
Filed Nov. 6, 1941  4 Sheets-Sheet 4
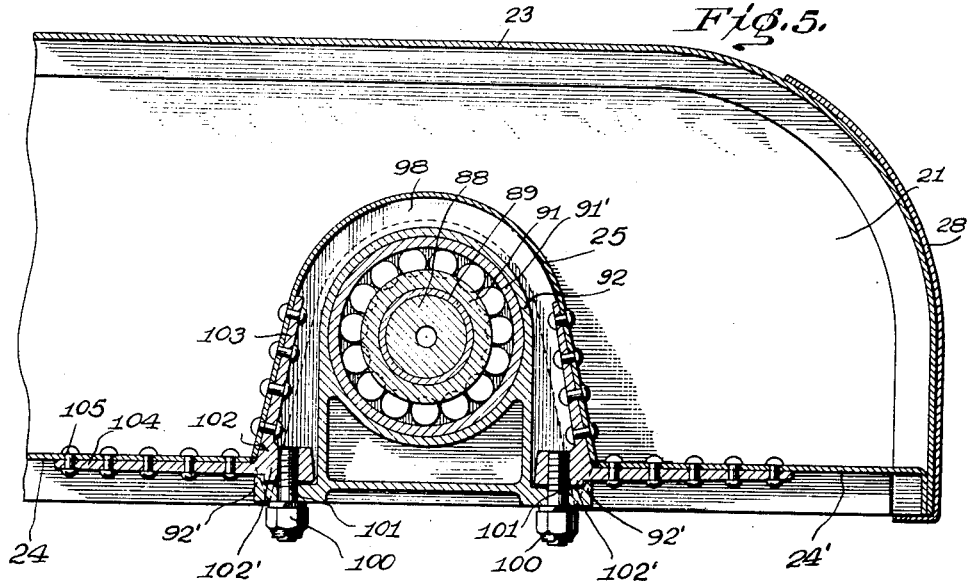
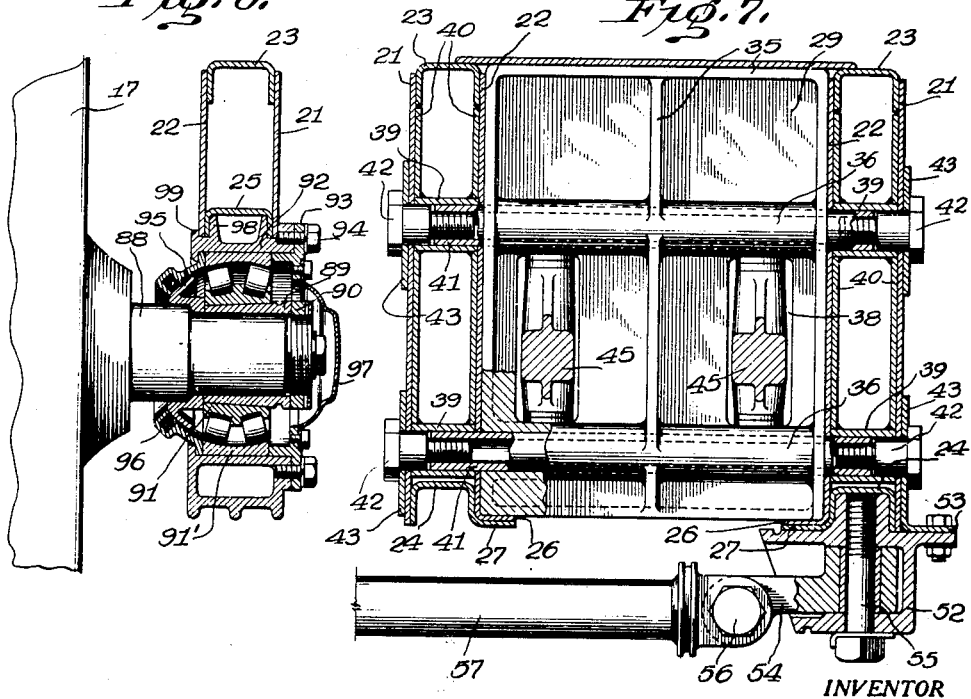
INVENTOR
Joseph Ledwinka
BY John P. Tarbox
ATTORNEY Patented Feb. 27, 1945

2,370,605

UNITED STATES PATENT OFFICE 2,370,605

TRUCK, ESPECIALLY FOR RAIL CARS

Joseph Ledwinka, Philadelphia, Pa., assignor to Edward G. Budd Manufacturing Company, Philadelphia, Pa., a corporation of Pennsylvania Application November 6, 1941, Serial No. 417,991

11 Claims. (Cl. 105—179)

The invention refers to a truck, especially for rail cars. More particularly, the invention refers to that type of truck carrying two wheels on the same side of the car and being connected to the vehicle superstructure pivotally about a substantially perpendicular axis.

Among the objects of the invention is a truck combining light weight with great strength, rigidity and durability.

Another object of the invention is a truck which can easily and at low cost be manufactured from sheet material such as highly cold rolled austenitic stainless steel.

A still further object of the invention is a truck in which the wheels and their axles contribute to the stiffness of the truck frame.

Further objects of the invention are the provision of simple and efficient means for connecting the truck to the body superstructure, the wheels to the truck frame, and for suspending the brake mechanism.

The objects of the invention are in a large part achieved by the use of pairs of elongated closed box-sectional girders arranged on edge on both sides of the wheels and by the use of transverse walls between the two girders serving not only for the purpose of strengthening the structure but also for the suspension of accessories such as the brake mechanism.

Further objects, features and advantages of the invention will become apparent from the following description of an embodiment of the invention which is illustrated in the attached drawings.

In the drawings:

Figure 1 is a plan view of a truck structure, partly in section, and of fragmentary parts of the body superstructure;

Figure 2 is a side elevation partly in section along line 2—2 of Figure 1 of the same truck structure and the adjoining portion of the body superstructure;

Figure 3 is an end elevation of the truck structure shown in Figures 1 and 2, partly in section along line 3—3 of Figure 1, and also of the adjoining parts of the body superstructure;

Figure 5 is a fragmentary vertical, longitudinal section along line 5—5 of Figure 1, likewise at a larger scale, showing the details of the connection between one of the side girders and an axle box;

Figure 6 is a fragmentary vertical, transverse section along line 6—6 of Figure 2, at the scale of Figure 5, showing likewise details of the construction of one girder and one of the axle boxes;

Figure 4:
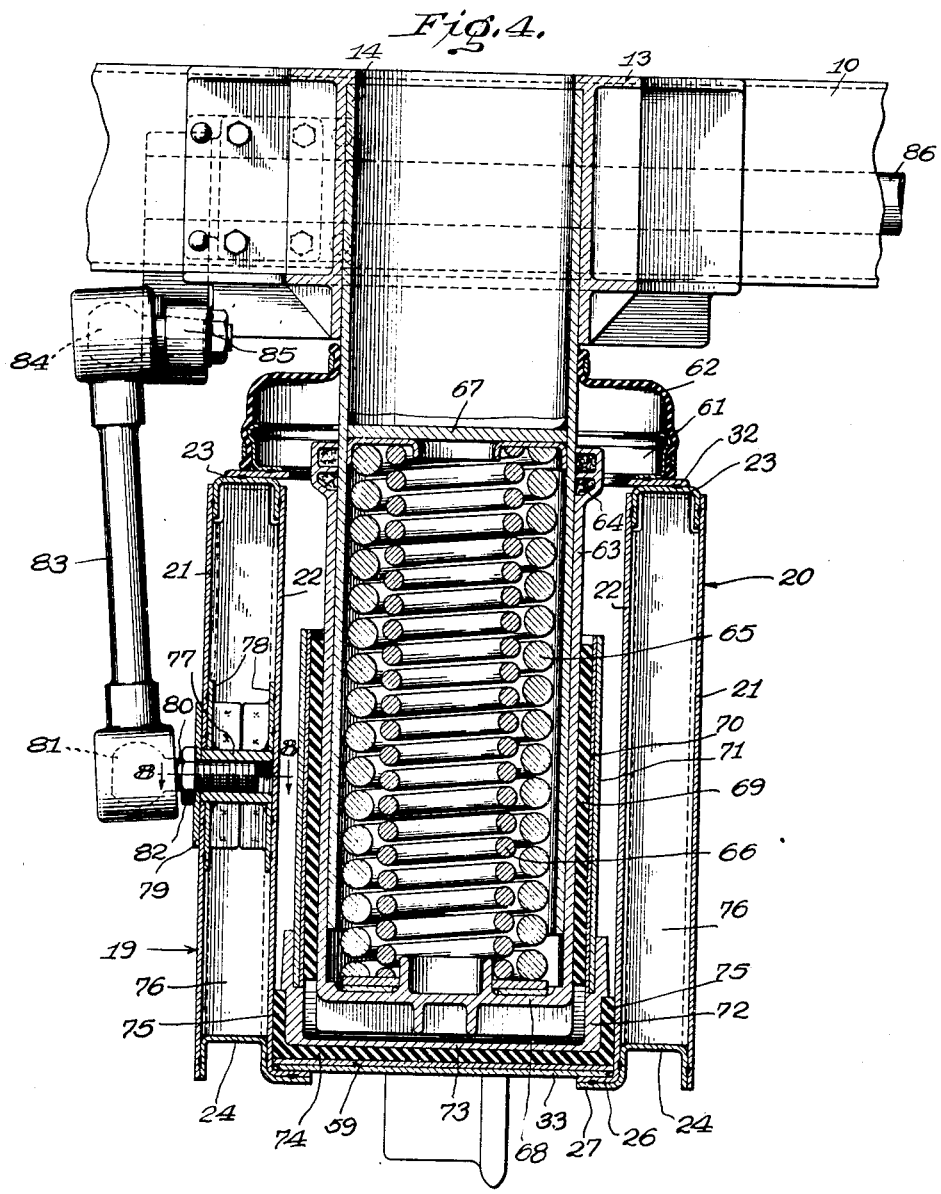
Figure 4 is a section through the king pin suspension and the spring arrangement as well as through adjoining parts of one individual truck, substantially along line 4—4 of Figure 2, yet at a larger scale.
Figure 8:
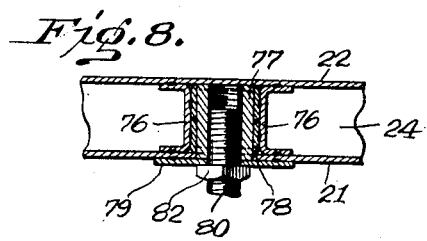

Figure 7 is a fragmentary vertical, transverse section substantially along line 7—7 of Figure 2, at a larger scale, showing one of the transverse reinforcing walls between two girders serving simultaneously for the support of the brake levers, and showing furthermore the connection between one of the trucks and a tie rod; and Figure 8 is a fragmentary horizontal section at the scale of and along line 8—8 of Figure 4, showing the attachment of the equalizing system to one of the girders, and the reinforcing means for such girder in this region.

10 is a pair of transverse bolster sills of a vehicle superstructure or body. These sills are connected to a central longitudinal sill 11 which is indicated by dash-and-dot lines in Figure 3. The two girders 10 are interconnected near their ends by castings 12, 13 in each of which is firmly held a tubular member 14. Each member 14 constitutes a king pin for one of the two trucks 15 and 16; the details of the king pin connection will be described later on. Each truck carries two wheels 17, 18 in tandem arrangement. The construction of each individual truck 15 and 16 being substantially the same, the further description will substantially be confined to the truck 16.

The truck 16 comprises a pair of longitudinally extending girders, an outer girder 19 and an inner girder 20, each of which presents a thin, flat, elongated, box-sectional structure arranged on edge, the two girders 19 and 20 being arranged on both sides of the wheels 17 and 18.

Each girder 19 or 20 comprises longitudinally extending, substantially flat sheet metal plates 21, 22 which are spaced from one another and interconnected along their outer margins by U-section rails 23, 24 and 24'. The plates are cut out at the location of the wheels and interconnected along the margins of the opening by a U-section rail 25 which interconnects or forms a continuation of the rails 24 and 24'.

The rails 23 extend uninterruptedly along the upper margins and both end margins of each girder 19, 20 and have their opening directed toward the interior of the girders and their arms connected, such as by electric spot or seam welding, to the marginal portions of the plates 21 and 22. The rails 24, 24', 25 have their open sides facing away from the interior of the girder and have their arms likewise connected, such as by electric spot or seam welding, in overlapped relation to the lower margins of the plates 21, 22. In the region between the wheels, the plates 22 of the two girders 19 and 20 are provided with an inwardly extending flange 26 and the rails 24 are provided with a corresponding flange 27. These flanges serve for additionally reinforcing the central region of the girders and for purposes which will be described later on.

The two girders 19 and 20 are interconnected by a number of transverse plates, walls or webs 28, 29, 30 and 31 on either side of the king pin 14, and in the region of the latter by an upper plate 32 and a lower plate or web 33, the latter forming part of and a connection between the two walls or webs 30. The plates 28 conform in shape and are connected, such as by spot welding, to the end portions of the rails 23 of the two girders 19 and 20. Besides, the plates 22 are provided at their ends with flanges 34 which underlie and are likewise fastened to the plates 28.

Each wall or web 29 constitutes a casting or forging having reinforcing marginal and intermediate ribs 35, a pair of horizontally extending cylindrical sleeves 36, two pairs of ears 37 and two openings 38. Aligned with the sleeves 36 are sleeves 39 in the interior of each girder 19 and 20, and openings in both walls of the girder. The two sleeves 39 in each girder have their ends extended into one pair of plates 40 which latter are welded to said sleeves, and rest against and may be fastened to the girder walls 21, 22.

A sleeve or rod 41, having an outer diameter which about equals the inner diameter of the sleeves 36 and 39, extends through each set of sleeves 36 and 39. Screw bolts 42 extend into the correspondingly screw-threaded ends of the sleeves 41 and clamp the two girders 19, 20 firmly from both sides against the wall 29. Reinforcing plates 43 on the outside of the walls 21 strengthen the latter around the bolts 42.

The aforesaid ears 37 of the plates 29 support pivot pins 44 for brake levers 45. One arm of each lever 45 extends through one of the openings 38 in plate 29. The brake levers 45 carry at one of their ends the brake shoes 46, whereas the other ends engage pistons in the interior of the brake cylinders 47. The levers 45 at one end of each truck are furthermore connected by a linkage system 48 to a shaft 49 and a lever 50 which latter is to be connected to a—not shown—hand or emergency brake handle or wheel. The shaft 49 is likewise supported by ears 51 forming an integral part of the wall 29.

Attached to the outer girder 19 is a pair of brackets 52, one on either side of the king pin 14 and substantially in the longitudinal region of the walls 29. These brackets 52 rest against the underside of and are bolted to the flanges 26, 27 and an outwardly extending flange 53 bent off from the outer lower plate 43. Journalled to each bracket 52 is a link 54 by a perpendicularly arranged pin 55. Corresponding links 54 on the trucks 15 and 16 are journalled by horizontally arranged bolts or pins 56 to a tie rod 57 which assures the maintenance of the parallel relation of the two trucks.

The transverse perpendicular walls 30 are attached to the walls 22 of the girders by means of angle-section strips 58. The connecting portion 33 between the two walls 30 is formed according to the surface of a cylinder and is reinforced by an inner correspondingly shaped plate 59. The wall 33 rests on the central portions of the flanges 26, 27 which are in this region correspondingly downwardly curved. The upper margins of the walls 30 are inwardly flanged at 60. The plate 32 rests and is connected such as welded to said flanges 60 and to the web of the rails 23 of the two individual girders. The spaces between the plate 32 and the walls 29 are closed by the plates 31 which are likewise connected such as by spot welding to the rails 23 and the end margins of the plate 32.

The plate 32 is provided with a large opening concentric to the king pin 14. A collar 61 is welded to the plate 32 around the opening and serves for the attachment of one end of a flexible annular diaphragm 62, the other end of which is attached to the king pin 14.

The king pin 14 is slidable into and out of a sleeve 63, packings or oil seals 64 being provided between the upper end of the sleeve 63 and the king pin 14. A set of coil springs 65, 66 are arranged concentrically to the axis and in the interior of the hollow king pin 14. The upper ends of the springs rest against a transverse wall 67 welded into the king pin 14, whereas the lower ends rest against an end wall 68 of the sleeve 63.

The sleeve 63 is surrounded by a rubber sleeve 69 and two metal sleeves 70, 71, and at its lower end by a casting or forging 72. The rubber sleeve 69 is adhesively fastened such as vulcanized to the sleeves 63 and 70, and the lower ends of the sleeves 70, 71 are held in a recess of the member 72. The lower wall 68 of the sleeve 63 is normally spaced from the bottom wall 73 of the member 72 so that all the stresses exerted by the springs 65, 66 on the sleeve 63 have to be transmitted in shear to the sleeve 70 and the member 72.

The member 72 has its bottom wall 73 shaped according to a section of a cylinder concentrically to the walls or webs 33, 59. Between the bottom portion of the member 72 and the walls 33, 59 another rubber pad 74 is inserted which has lateral portions 75 extending between the lateral outer surfaces of the member 72 and the walls 22 of the side girders. The rubber pad 74 may have one of its surfaces vulcanized to the adjacent member or members, whereas the other surface is disconnected so that a sliding movement may take place. Such movement would be a swinging movement of the truck frame with respect to the king pin about a horizontal axis coinciding with the axis of the cylindrical portions 33, 59, 74 and 73. The rubber inserts 69 and 74 do not only permit the necessary movement between the body frame and the truck frame, but they also prevent the transfer of shocks, vibrations and noise from the truck frames to the body.

The walls 21, 22 of the two girders 19, 20 are reinforced and braced against each other in the region of the king pin, by a pair of channels 76 which have their arms welded to said walls and their upper ends welded to the upper rails 23. Inserted between the two rails 76 of the girder 19 is a sleeve 77 held in place by two U-section members 78. The members 78 have their arms attached to the bottom walls of the channel 76, and their bottom walls attached such as by welding to the girder walls 21, 22. The bottom walls of the members 78 surround and are welded to the ends of the sleeve 77. The construction is so far somewhat similar to the previously described sleeves 39 and their plates 40. The sleeve 77 is tapped, and screwed into it through openings in wall 21 and in an outer reinforcing plate 79 is a bolt 80 which has a spherical head 81. 82 is a lock nut. Journalled to the head 81 is one end of a link 83, the other end of which is journalled to another spherical head 84 at the end of a lever 85. Lever 85 is secured to one end of a torsion rod 86 which is rotatably supported in bearings 87 attached to the body cross sills 10. The torsion rod 86 extends across the space between the two trucks and has its other end connected by a corresponding lever and linkage system to the other truck 15 with the result that any vertical movement of one truck with respect to the body will, at least partly, be transferred to the oher truck thereby equalizing the movements.

The wheels 17, 18 are each rigidly connected to an axle 88 extending a short distance beyond each side of the respective wheel hub. Firmly secured by means of an annular wedge 89 and a nut 90 is the inner race 91 of a spherical roller bearing. The outer race 91' of the bearing is secured in an axle box 92 by means of a cover plate 93 and bolts 94. Oil seal members 95 and 96 are connected respectively to the axle 88 and the axle box 92. These members have complementary spherical surfaces, the center of which coincides with the center of the spherical bearing. 97 is a removable axle box cover. The axle box 92 has on both sides a pair of flanges 98, 99 defining a narrow slot between them. Into these slots fit the arms of the girder rail 25 and the adjacent marginal portions of the girder plates 21 and 22. When the axle box is slid from below into its position in the girder, it is secured in place by means of nuts 100 and stay bolts 101, which latter are held by brackets 102. The brackets 102 have two long arms 103, 104 which are fastened such as by rivets 105 to the bottom walls of the girder rails 24, 25, and 24', 25 respectively.

The axle box 92 is provided along its lower part with upwardly projecting, transversely extending ribs 92' which, when the box is in place, engage corresponding downward ribs or projections 102' of the brackets 102. By these provisions, the axle box functions as a rigid bridge between the lower corners of the recess in the girder.

It is apparent that the axle box constitutes, when in place, a strong reinforcement for the individual girder to which it is attached. It is furthermore apparent that, on account of the connection between the axle 88 and the axle box, the axle constitutes a transverse reinforcement between the two individual girders 19, 20 of the truck frame. It should also be noted in this connection that the sides of the recess for the axle box and the sides of the axle box converge upwardly thereby obtaining a wedge action.

Attached to one of the axles 88 is a drive gear 106 for an electric generator (not shown), the latter to be supported by the body superstructure and connected to the drive gear 106 by a flexible shaft of which only the one end 107 is shown in Figures 1 and 3. The drive gear 106 is supported by the axle 88 itself, but it is prevented from rotating with or swinging about the axle by a projection 108 which is held by a rubber bushing 109 in a bracket 110 of the girder 20.

The plates, webs, rails and the like constituting the body and truck structures are preferably made of austenitic stainless steel, the strength of which has been materially increased by cold working and said members are preferably connected by a spot or seam welding method known under the trade-mark "Shotweld" system, which does not deleteriously affect the anti-corrosion properties and the cold-work strength of such material.

The described and illustrated truck construction is believed to be unusually light and yet strong, partly owing to the fact that numerous members fulfill not only one but several functions. For instance: the walls 29 do not only interbrace the individual girders 19 and 20, but they serve also for the support of a substantial part of the brake system; the walls 30 do not only constitute part of the system for supporting the body superstructure on the truck, but serve also for supporting the brake cylinders; the axles and axle boxes do not only serve for supporting the wheels but also for reinforcing the individual girders 19 and 20 and for interbracing the two girders of each truck.

While only one embodiment of the invention has been shown and described, it is obvious that the invention is susceptible of many modifications, and that many individual features may be used in connection with trucks or vehicles differing in other respects from the disclosed embodiment. All such modifications and adaptations of the invention are intended to be covered by the appended claims.

What is claimed is:

1. In a vehicle truck frame; a pair of girders on one side of the truck; each girder being in the form of a closed box-sectional, elongated, narrow but high structure composed of sheet material; the two girders of the pair being arranged on edge, in the longitudinal direction of the truck, and transversely spaced from each other so as to adapt the structure for the reception of one wheel each between the ends of the girders; transverse members connecting the two girders into one substantially rigid frame; said transverse members comprising a plurality of upright transversely arranged webs or walls having their lateral margins rigidly secured to the two girders, at least one of said webs or walls being arranged between the ends of said girders.

2. In a vehicle truck frame; a pair of girders on one side of the truck; each girder being in the form of a closed box-sectional, elongated, narrow but high structure composed of sheet material; the two girders of the pair being arranged on edge, in the longitudinal direction of the truck, and transversely spaced from each other so as to adapt the structure for the reception of one wheel each between the ends of the girders; means connecting the two girders into one substantially rigid frame; said means comprising members extending from one girder to the other in the region between their upper and lower margins and in the same longitudinal region substantially horizontally arranged webs or plates attached to the girders along their upper and lower margins respectively.

3. In a vehicle truck frame; a pair of girders on one side of the truck; each girder being in the form of a closed box-sectional, elongated, narrow but high structure composed of sheet material; the two girders of the pair being arranged on edge, in the longitudinal direction of the truck, and transversely spaced from each other so as to adapt the structure for the reception of one wheel each between the ends of the girders; transverse members connecting the two girders into one substantially rigid frame; said transverse members comprising a plurality of upright, transversely arranged plates or webs; the different webs being spaced from one another in longitudinal direction and being rigidly secured to the two girders; said transverse members comprising furthermore substantially horizontally arranged webs or plates attached to the girders along their upper and lower margins respectively and closing the space between successive upright webs.

4. In a vehicle truck frame; a pair of girders; each girder being in the form of a closed box-sectional, elongated, narrow but high structure composed of sheet material; the two girders of the pair being arranged on edge, in the longitudinal direction of the truck, and transversely spaced from each other so as to adapt the structure for the reception of one wheel each between the ends of the girders; transverse members connecting the two girders into one substantially rigid frame; said girders comprising two substantially flat plates which are spaced from each other in transverse direction, and U-section rails having arms overlapped by and attached to the margins of said plates whereas their web closes the space between said plates.

5. In a vehicle truck frame, a pair of girders; each girder being in the form of a closed box-sectional, elongated, narrow but high structure composed of sheet material; the two girders of the pair being arranged on edge, in the longitudinal direction of the truck, and transversely spaced from each other so as to adapt the structure for the reception of one wheel each between the ends of the girders; transverse members connecting the two girders into one substantially rigid frame; said girders comprising two substantially flat plates which are spaced from each other in transverse direction, and U-section rails having arms overlapped by and attached to the margins of said plates whereas their web closes the space between said plates; one of said rails having its mouth facing toward the interior of the girder and extending substantially uninterruptedly along the upper and the end margins of the girder; others of said rails facing downwardly away from the interior of the girder and extending along the lower margin of the girder.

6. In a truck frame; a hollow box-sectional girder comprising side walls which extend substantially parallel to and being transversely spaced from each other; a sleeve; end plates rigidly connected to the ends and extending transversely to the axis of said sleeve; said sleeve with its ends plates being inserted between and attached to said walls; said sleeve and plates forming a transverse brace and spacer between said side walls and said sleeve being adapted to receive a bolt connecting said girder to another member.

7. In a truck frame; a pair of girders arranged on one side of the truck and being mainly formed of sheet metal; each girder constituting an elongated, transversely thin and perpendicularly wide structure; said girders being spaced from each other and adapted to receive a wheel between each of their ends; transverse connecting plates between the two girders; certain of said plates being arranged in longitudinal direction at a distance from the ends of the girders and adapted not only to interbrace the two girders but also to support brake means for the wheels.

8. In a truck frame; a pair of girders arranged on one side of the truck and being mainly formed of sheet metal; each girder constituting an elongated, transversely thin and perpendicularly wide structure; said girders being spaced from each other and adapted to receive a wheel between each of their ends; transverse connecting plates between the two girders; certain of said plates being arranged between the middle portions of said girders, being in the form of a casting or forging and being provided with bearings and openings for brake levers to be supported by and to extend through said plates.

9. In a truck frame according to claim 7, a bracket adapted to receive a tie rod being attached to one of said girders in the region where it is reinforced by one of said transverse plates.

10. In a truck; a girder comprising two transversely spaced upright plates; said plates being provided along their underside each with a recess; a U-section rail being inserted between said plates along the margin of the recess; said rail having its arms connected in overlapped relation to said plates, and said arms extending toward the middle of the recess; an axle box having two parallel grooves slid over the arms of said rails and the adjoining margins of the plates; said axle box constituting an effective cross brace between the two plates of the girder.

11. In a truck; according to claim 10; the upright portions of said arms of the rails and of the adjoining margins of the plates being straight and converging upwardly toward each other; said axle box having correspondingly converging grooves; means for holding said axle box firmly in the recess of said frame.

JOSEPH LEDWINKA.